Sept. 19, 1939.　　　H. W. FAWCETT　　　2,173,579
CENTRIFUGAL CREAM SEPARATOR
Filed May 21, 1936　　　3 Sheets-Sheet 3
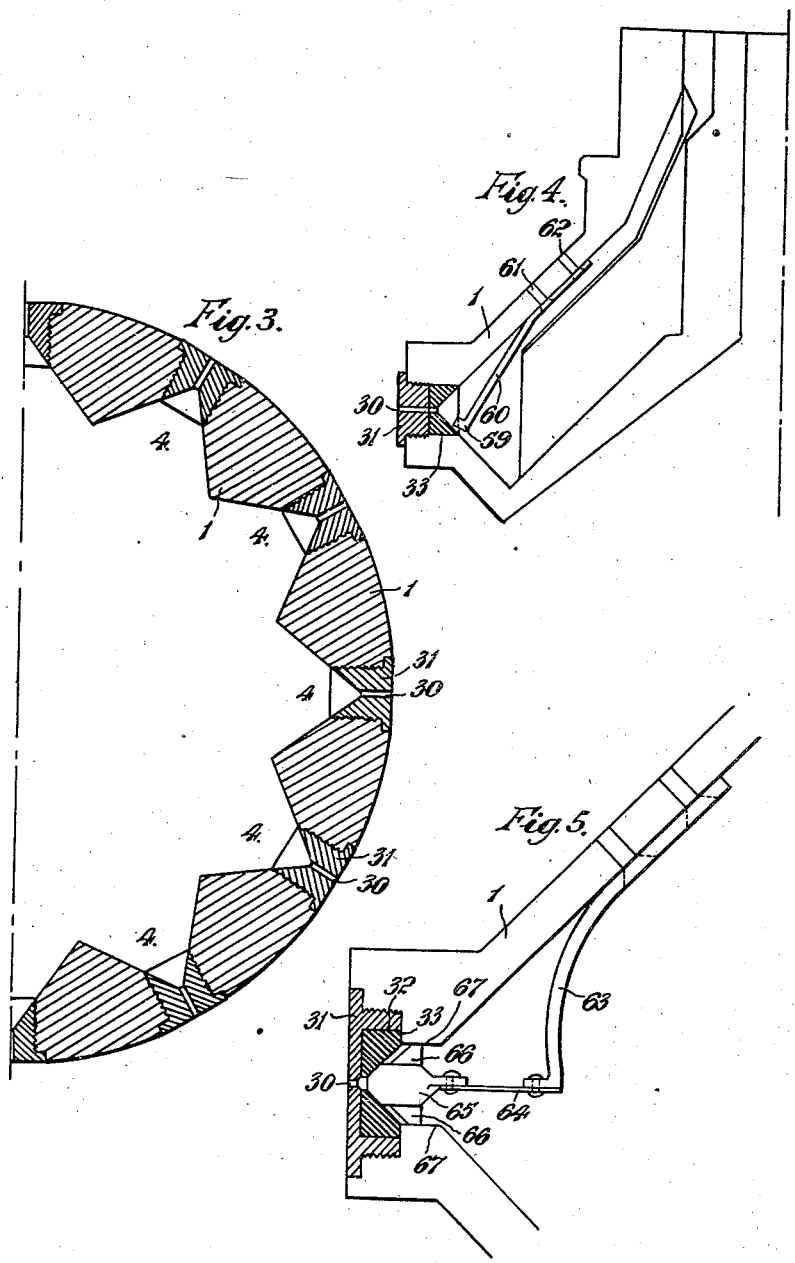
Inventor
Harold William Fawcett
By [signature]
his ATTY.

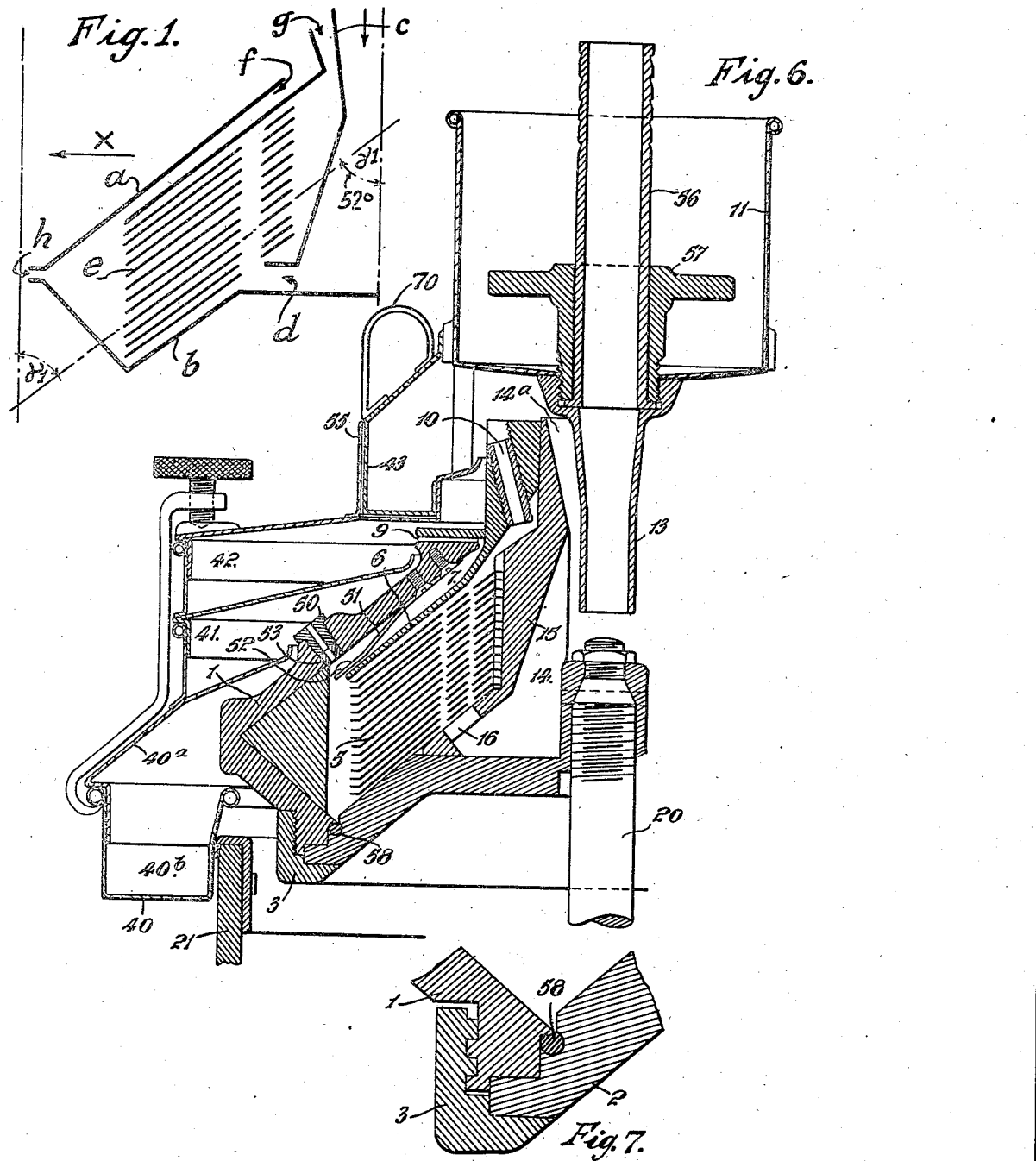

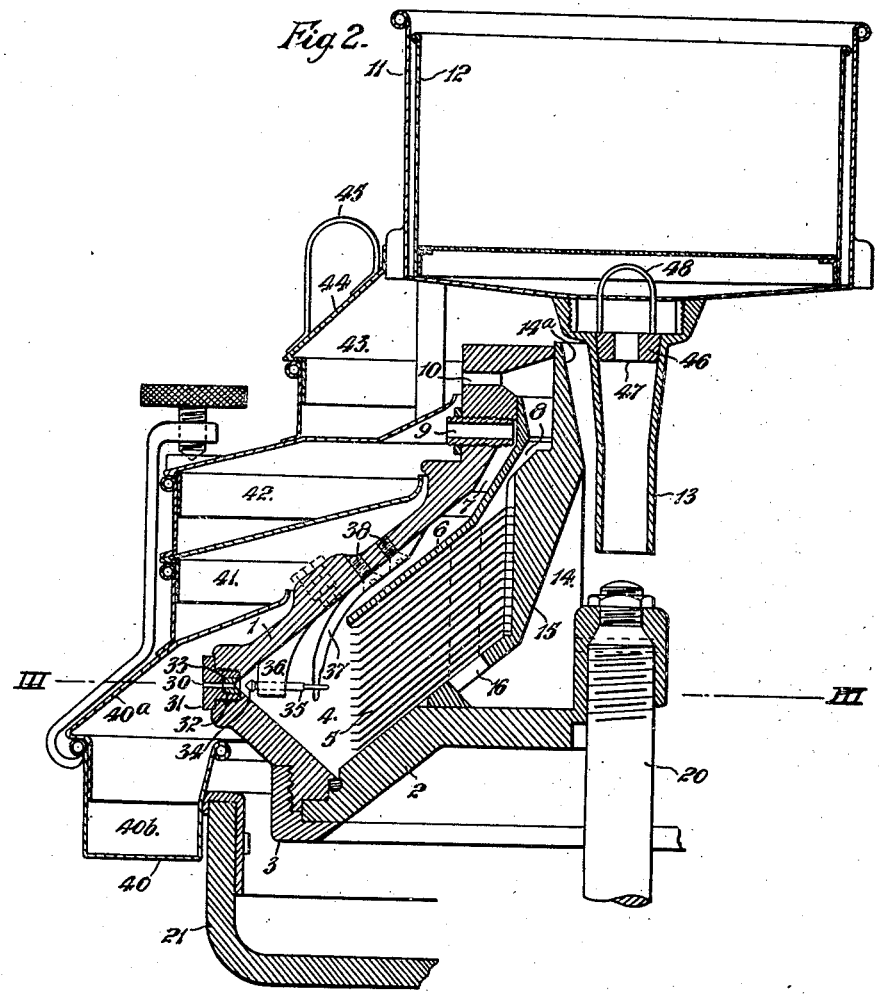

Patented Sept. 19, 1939

2,173,579

UNITED STATES PATENT OFFICE 2,173,579

CENTRIFUGAL CREAM SEPARATOR

Harold William Fawcett, Harrogate, England

Application May 21, 1936, Serial No. 80,966
In Great Britain May 23, 1935

4 Claims. (Cl. 233—20)

This invention relates to centrifugal cream separators.

One object of the present invention is so to devise a cream separator in which gelatinous slime, skim milk and cream, are conveyed to their respective discharge apertures, and discharged with certainty therefrom when desired, leaving each separate part of the separator bacterially clean and sterile.

I have found that this can be effected by constructing all the inner surfaces, on which the contents of the separator press radially outwards, as smooth surfaces sloping towards one or other of the discharge apertures or ports of the separator at an angle with respect to the axis of rotation which is greater than the angle of friction of the constituent or constituents bearing on the surfaces concerned under the condition under which the separator is operated.

The invention is illustratively exemplified in the accompanying drawings in which Fig. 1 is a diagrammatic half-section through a separator according to the present invention, Fig. 2 is a vertical section through one half of one embodiment of the invention showing the general arrangement of the apparatus and one form of valve, Fig. 3 is a plan section of the separator casing along line III—III of Fig. 2, Figs. 4 and 5 illustrate alternative forms of valves which can be used in the centrifugal separator according to Fig. 2, Fig. 6 is a vertical section through one half of a second embodiment of the invention, and Fig. 7 is an enlarged sectional view of a detail of the devices according to Figs. 2 and 6.

Referring now to the figures and first to Fig. 1, this figure illustrates diagrammatically a separator according to the invention in which none of the inner surface extends parallel to the axis of rotation or in other words at right angles to the direction in which the centrifugal force is acting. In this form of separator an outlet $h$ for the separated gelatinous slime is provided at or in the vicinity of the part of the maximum internal diameter of the machine. The inner surfaces of the parts $a$ and $b$ are sloped at an angle $\alpha$ to the axis of rotation which is greater than the angle of friction of the gelatinous slime and preferably at an angle to the axis of the separator exceeding 45° so that it is impossible for any slime to settle on said parts. Similarly, the outlet $g$ slopes in relation to the axis, at an angle exceeding the angle of friction of the separated cream so that all the cream slides with certainty to the outlet $g$. This latter angle may therefore be less than that of the inner surfaces of the casing parts $a$ and $b$ since the angle of friction of the constituent issuing through the outlet $g$ is substantially less than that of the separated gelatinous slime. Moreover the angle of slope $\alpha$ of the discs of the disc pack $e$ exceeds the angle of friction of the aforesaid gelatinous slime and is consequently substantially greater than the customary angle of slope of conical separating discs.

According to a further feature of the present invention the inner surfaces of the inlet $c$ and distributor $d$ are sloped towards their respective ends to such an extent that milk cannot settle thereon but flows either upwards towards the end of the inlet $c$ or downwards into the disc pack $e$. The slope of these members $c$ and $d$ may be considerably less than that of the inner surfaces of the parts $a$ and $b$ since the relatively high rate of flow of liquid along these surfaces and the relatively small centrifugal force prevailing at this radius, prevents separation of the gelatinous slime at this stage and ensures the inner surfaces of the members $c$ and $d$ being kept clean.

In order to ensure the discharge of the separated gelatinous slime during the operation of the separator the slime outlets $h$ are provided with discharge valves constructed and adapted to operate in the manner hereinafter described.

It is well known that the centrifugal force obtaining at any point in a centrifugal separator varies as the square of the speed of rotation thereof and the discharge valves of the separator of the present invention are so constructed or arranged that at the normal running speed of the separator, they close the peripheral discharge apertures, whereas at speeds lower than said normal running speeds, said valves are caused to open and to permit the whole contents of the separator to be discharged.

A cream separator in accordance with the present invention can thus be adapted to function as an ordinary cream separator at normal running speed, but when slowing down after use or when run at lower speeds, to discharge its contents and to dry itself. Moreover when run at such lower speeds the separator may be washed by washing liquid introduced thereinto and discharging through the opened slime outlets.

In order to achieve the foregoing objects, the valves controlling the peripheral slime outlets are arranged so as to be subjected to two forces, one of which is substantially constant and the other of which, namely the centrifugal force, varies as the square of the speed of the separator. In the preferred form of the invention, the substantially constant force is supplied by a spring and is so dimensioned that at the normal running speed of the separator it is overcome by centrifugal weight of the spring or springs and that of the valve or valves, whereas at lower speeds it exceeds said centrifugal weight.

Preferably, the spring effecting the closing of a slime outlet or carrying a disc or plug valve cooperating with the said slime outlet, is secured to the inside of the casing or to the top disc of the disc pack in such a way as not to interfere with the operation of the conical separating plates of the pack.

The valves and slime outlets are so shaped or arranged that they afford no possibility of any of the separated components settling thereon. Similarly, the springs are so arranged (sloping towards the slime outlets) or of such a section (e. g., streamline section) that they present no parts on which separated components can settle.

The valve may be constituted by a flat spring secured to the interior of the separator casing. Alternatively, the valve may be mounted on a spring arm of streamline section also secured to the interior of the separator.

In this embodiment likewise, the seating may either consist of resilient material such as rubber or the closure may be a metal-to-metal one in which case, the segment should be of very thin and flexible spring metal. A special drain valve may be arranged to open before the slime outlets so as to drain off the cream and milk in the separator into a separate tin and avoid contamination thereof by the sludge discharged from said slime outlets.

A further feature of the present invention resides in the packing or joints between the various separable parts of the casing. I have found that in the case of cream separators, rubber rings of normal cross-section are unsuitable as packing material for joints since they form spaces within which separated components can collect and decompose.

In the cream separator of the present invention therefore, the joint of rubber or the like is held permanently under compression in a recess formed between two separable parts of the machine. One face of said joint is exposed to the contents of the separator and is of such a contour or slope that it provides no permanent lodgment for any separated constituents which are caused to slide away from or across the joint.

In order to permit the separator and even the tinware to be efficiently rinsed without the necessity of dismantling any parts thereof, provision is made for connecting to the liquid inlet to the casing a source of rinsing fluid (e. g., water) under pressure. To this end, the non-rotating supply conduit to the machine is provided with a suitable connection adapted to receive a hose or the like, and the tinware is so arranged that it slopes in all directions towards the outlet port or ports, thus ensuring that all liquid entering the tinware completely drains out of it. The rinsing fluid after cleaning the separator casing is discharged from all the outlets of the machine and enters the tinware in the form of a rotary spray and efficiently rinses the latter. In order to assist in rinsing the overflow conduit from the distributor, said conduit is outwardly tapered instead of cylindrical as normally.

Referring to Figs. 2 and 3, the reference numerals 1 and 2 denote the two parts of the casing of the separator which are secured together by a lock ring 3.

The casing 1, 2 is so constructed as to provide a number of conical bays 4 and the angles of slope of the inner surfaces of the parts 1, 2 and of the bays 4 are made greater than that of the sliding angle or angle of friction of the separated gelatinous slime. Located inside the casing 1, 2 is the usual disc pack 5 of conical separator plates mounted between the casing part 2 and the usual milk-cream separating disc 6 which latter provides passages 7 and 8 for the outlet of skim milk and cream respectively, the skim milk issuing through one or more ports 9 whilst the cream issues through one or more ports 10. Milk to be separated is poured into a stationary tin 11 within which is mounted a strainer 12 and flows through a nonrotating inlet pipe 13, down sloping fluted channels 14 formed in a rotating distributor 15 and through holes 16 therein to the disc pack 5. The flutings in said channels are so arranged as to each to lead to one hole 16, thus providing no possible lodgment for any constituents. The casing 1, 2 is mounted on a rotating spindle 20 in the usual manner.

21 is a non-rotating frame carrying the driving mechanism for the spindle 20 and tinware (hereinafter more fully described) for collecting the various discharges.

At the apex of each conical bay 4 is a slime outlet or discharge aperture 30 formed in a removable screw threaded nozzle 31 which is preferably recessed at 32 to receive a rubber or the like washer 33 serving as a seating for a valve 34 having a stem 35 movably mounted in and guided by a bracket 36. The rear end of the valve stem 35 is provided with a slot (not shown) through which passes one end of a wire spring 37 the other end of which is secured to the inside of the casing part 1 by screws or rivets 38.

The elasticity and centrifugal weight of the spring 37, the centrifugal weight of the valve 34 and valve stem 35 and the distance between the valve and its seating are so co-ordinated that at the normal running speed of the separator each valve 34 closes its respective discharge aperture 30 whilst at and below a predetermined speed lower than said normal speed said valves 34 remain open and permit the contents of the casing 1, 2 to be discharged through the discharge apertures 30.

It will be seen that in the hereinbefore described construction of valve mechanism, the arcuate movement of the spring 37 under the influence of centrifugal force is converted into a rectilinear radial movement of the valve 34.

The tinware hereinbefore referred to consists of a lower tin 40 having a sloping wall 40a against which the discharge from the discharge apertures 30 strikes and by which it is conveyed to the annular portion 40b of the tin. Said annular portion slopes spirally downward to the outlet spout (not shown), thereby enabling all the contents of the tin to flow to the spout. Above the tin 40 is a tin 41 the function of which will be hereinafter more fully described with reference to Fig. 4. Above said tin 41 is a tin 42 also provided with a spout (not shown) and adapted to receive the skim milk issuing through the port 9 whilst above said tin 42 is a tin 43 also provided with a spout (not shown) and adapted to receive the cream. In order to facilitate access to the tin 43 for the purpose of removing remnants of cream prior to washing the bowl and the tinware, said tin 43 is provided with a removable annular lid 44 provided with handles 45.

46 is a restricting plug having a bore 47 of less diameter than the supply pipe 13 and a handle 48, which plug is inserted into said pipe 13 during normal operation of the machine.

The hereinbefore described cream separator operates as follows:

The machine is first run empty until it reaches its normal running speed. During this operation the valves 34 which are normally held by the spring 37 in the retracted position shown in the figure, move outwardly under the influence of centrifugal force and bear against their seatings 33 thereby closing the discharge apertures 30. Thereupon milk is fed into the tin 11, passing through strainer 12, restricting plug 47 and supply pipe 13 into the separator proper where it is separated into skim milk and cream which flow along the sloping inner surface of the top casing part 1 and top disc 6 and issue through ports 9 and 10 respectively into their respective tins 42 and 43.

When the desired quantity of milk has been treated, the lid 44 of the cream tin 43 is removed and any cream adhering to said tin is scraped out.

Thereupon the speed of the machine is reduced until the valves 34 open and gelatinous and albuminous constituents which have collected in the bays 4 are discharged through the discharge apertures 30 together with any milk and cream still present in the casing 1, 2.

When this operation has been completed, the speed of the machine is again increased until the valves 34 close, whereupon the restricting plug 46 is removed and hot washing liquid such as water is introduced into the machine in such large quantities and at such a rate that it overflows from the apertures 9 and 10 and also the sloping upper part 14a of the distributor chamber. When the machine has been thoroughly washed its speed is again reduced until the valves 34 open, whereupon the washing liquid drains off through the ports 30. As soon as the washing liquid issuing from the spout attached to the tray 40 appears clear, the supply of said washing liquid is discontinued, the washing liquid at this juncture not only having cleaned the interior of the machine, but also having rinsed the tins 43, 42 and 40.

After the supply of washing liquid has been discontinued, the machine is allowed to rotate for a short time until the interior thereof is completely dry.

The tins 43, 42, 41 and 40 are then detached and dried separately. The separator bowl is thus cleaned and dried mechanically within a very short space of time.

In the alternative form of valve shown in Fig. 4, the valve 59 is integral with a spring 60 of streamline section. Said spring is fixed to the inside of the separator bowl 1 at points 61 and 62, and is so arranged that at the normal running speed, the arcuate path described by the valve 59 will cause it to close the peripheral discharge aperture 30. It will be seen that this is only possible by virtue of the fact that the valve seating 33 is constructed of compressible material such as rubber.

In the embodiment of valve shown in Fig. 5, the rubber valve seating 33 is held under pressure in the nozzle 31 thus closing up all joints between rubber and metal and consequently offering no lodgment for bacteria and the like. The end of a spring 63 of streamline section moves in an arcuate path and this arcuate movement is transmitted by a flexible connecting member 64 to the valve 65 which is provided with guide fins 66 travelling in a channel 67 and the arcuate movement of the end of spring 63 is thus converted into a rectilinear movement of the valve 65. The connecting member 64 may take the form of a thin leaf spring, or it may be constructed integral with the valve 65 and the spring 63.

Referring to Fig. 6, it will be noted that the embodiment illustrated therein, whilst retaining the sloping inner surfaces characteristic of the present invention, differs from that illustrated in Fig. 2 in the following particulars:

One or more additional spring-operated valves 50 are disposed in the wall of the casing 1 approximately in alignment with the outer edge of the disc pack 5. Said valve consists of a detachable plug 50 carrying a valve seating 53 preferably constructed of resilient material such as rubber. Coacting with said valve seating is a spring operated valve 52 attached by a wire spring 51 to the inside of the casing 1.

The action of this device is as follows:

The tension in the spring 51 is adjusted so that on completion of the separation and on the bowl being slowed down, valve 52 is adapted to open before valves 34, thereby allowing the skim milk and cream contained in the bowl to escape and be collected in the tin 41. The gelatinous sludge is discharged separately into the tin 40 in the manner hereinbefore described with reference to Fig. 2. The effect of this device is to effect an economy in milk over a prolonged period of running by preventing the milk and cream contents of the separator becoming contaminated by the gelatinous sludge.

In order to minimize as far as possible any losses of cream, caused by same adhering to the tin 43, said tin is constructed to be of the minimum practical diameter. This involves reducing the lateral dimensions of the feed-tin 11 below those customary. In order further to facilitate cleaning of the bowl, the tin 43 is disposed within a tray 55, so that said tin 43 can be removed bodily while the bowl is still rotating. A steam connection 56 is made to the tube 13 through the nipple 57 thus enabling steam to be blown into the bowl and to sterilise it.

It should be noted that at all points when the liquids or sludge exert a force in an outward direction upon the walls of the bowl 1, the discs 5, the distributor 15, the springs 37 and 51 and the outlets 9, 10, and 14a, the surface slopes outwardly at a sufficient angle to prevent any particles adhering thereto.

The rubber joint 58 which is shown in detail in Fig. 7, is of special construction to avoid any matter accumulating therein and to enable solid and liquid constituents to slide unobstructed to the outlet 30. As can be seen from the drawings, the said joint offers no obstruction to the flow of the matter towards the outlets.

I claim:

1. A centrifugal separator for separating liquids having a light component, a heavy component, and a slime component, said separator comprising a bowl having an internal surface tapering to a maximum internal periphery and having a plurality of slime discharge outlets located at said maximum internal periphery, the inner surface of said bowl being inclined inwardly in all directions from each of said slime discharge outlets so as to define a plurality of bays the apex of each of which bays coincides with a slime discharge outlet, a valve for each of said slime discharge outlets, each of said valves being displaceably supported in said bowl to close the corresponding slime discharge outlet under the action of the centrifugal force at normal operating speed of revolution of the bowl, a spring arranged inside said bowl to urge said valve away from said outlet with a resilient energy sufficient to open said outlet on a predetermined reduction of the speed of revolution of said bowl below normal operating speed, a disc pack in said bowl, a distributor channel for the liquid to be treated, and outlet channels for the heavier separated constituent and for the lighter constituent of said liquid, all the internal surfaces of said valves, springs and channels which are encountered by outwardly pressing liquid, being sloped towards at least one of said outlets in at least one plane relative to the direction of centrifugal force, at an angle which is greater than the angle of friction of the constituents pressing against the respective surfaces, whereby the separator, when emptied, can be whizzed clean.

2. A separator, as claimed in claim 1, in which said valves and springs are of streamlined section.

3. A separator, as claimed in claim 1, in which said bowl comprises an upper and a lower portion and said springs are secured to the upper portion of the bowl.

4. A separator, as claimed in claim 1, comprising further at least one draining outlet nearer to the axis of the bowl than said slime discharge outlets, a valve displaceably supported in said bowl to close said draining outlet under the action of the centrifugal force at normal operating speed of revolution of said bowl, and a spring arranged inside said bowl to urge said valve away from said outlet with a resilient energy sufficient to open said valve before opening of the slime discharge valves when the speed of revolution of said bowl is reduced below normal operating speed.

HAROLD WILLIAM FAWCETT.